United States Patent

Yoshihara

[11] Patent Number: 5,936,228
[45] Date of Patent: Aug. 10, 1999

[54] DOT-CODE RECORDING METHOD AND DOT-CODE RECORDING AND REPRODUCING APPARATUS

[75] Inventor: Takafumi Yoshihara, Machida, Japan

[73] Assignee: Olympus Optical Co., Ltd., Tokyo, Japan

[21] Appl. No.: 08/553,064

[22] Filed: Nov. 3, 1995

[30] Foreign Application Priority Data

Nov. 15, 1994 [JP] Japan .................................. 6-280298

[51] Int. Cl.$^6$ .................................................. G06K 19/06
[52] U.S. Cl. ........................ 235/494; 235/454; 235/456; 235/462.32; 235/462.49; 235/472.01; 235/472.03
[58] Field of Search ................... 235/494, 462, 235/456, 454, 462.32, 462.49, 472.01, 472.03

[56] References Cited

U.S. PATENT DOCUMENTS

| | | | |
|---|---|---|---|
| 5,221,833 | 6/1993 | Hecht | 235/494 |
| 5,449,896 | 9/1995 | Hecht et al. | 235/494 |
| 5,454,054 | 9/1995 | Iizuka | 382/321 |
| 5,481,103 | 1/1996 | Wang | 235/494 |
| 5,521,372 | 5/1996 | Hecht et al. | 235/494 |
| 5,541,396 | 7/1996 | Rentsch | 235/454 |
| 5,576,532 | 11/1996 | Hecht | 235/494 |
| 5,591,956 | 1/1997 | Longacre, Jr. et al. | 235/494 |
| 5,694,102 | 12/1997 | Hecht | 235/456 |
| 5,717,197 | 2/1998 | Petrie | 235/494 |
| 5,736,724 | 4/1998 | Ju et al. | 235/462 |

FOREIGN PATENT DOCUMENTS

| | | | |
|---|---|---|---|
| 0670555 | 4/1994 | European Pat. Off. | 235/494 |
| WO 94/08314 | 4/1994 | WIPO | 235/494 |

Primary Examiner—Donald Hajec
Assistant Examiner—Douglas X. Rodriguez
Attorney, Agent, or Firm—Frishauf, Holtz, Goodman, Langer & Chick

[57] ABSTRACT

A dot-code recording method includes a step of generating a plurality of one-block dot patterns, each of which comprises a plurality of dots. The plurality of one-block dot patterns are then arranged to represent multimedia information, and a specific range of the plurality of one-block dot patterns are distributed according to specific rules to thereby arrange the one-block dot patterns within the specific range in non-time sequence. The non-time sequence distributed one-block dot patterns are then recorded on a recording medium.

7 Claims, 3 Drawing Sheets

5,936,228

DOT-CODE RECORDING METHOD AND DOT-CODE RECORDING AND REPRODUCING APPARATUS

BACKGROUND OF THE INVENTION

1. Field of the Invention

This invention relates to a dot-code recording method and a dot-code recording and reproducing apparatus.

2. Description of the Related Art

A dot-code recording and reproducing apparatus has been known which converts multimedia information, including audio information, video information, and digital code data, into dot codes and thereby effects recording and reproducing. PCT publication No. WO94/08314, which corresponds to PCT application No. PCT/JP93/01377, has disclosed such a recording and reproducing apparatus. This PCT application was assigned to the assignee of the present application.

When data is arranged in time sequence on a recording medium, data defects or errors are liable to occur due to dirt on or damage to the recording medium. To overcome this problem, as disclosed in PCT publication No. WO94/08314, by performing an interleaving process on the input data subjected to data compression, the data arrangement is distributed two-dimensionally, thereby lowering the probability of error occurrence.

With the conventional dot-code recording and reproducing apparatus, when the data has been distributed over too wide a range in the interleaving process, it is difficult to reproduce the data in real time. On the other hand, when a special emphasis is put on real-time aspect of data reproduction, this will localize the distribution of data arrangement, leading to a more adverse effect due to dirt on or damage to the recording medium.

SUMMARY OF THE INVENTION

A dot-code recording method and dot-code recording and reproducing apparatus of the present invention are intended to solve the above-described problems. It is, accordingly, an object of the present invention to provide a dot-code recording method and a dot-code recording and reproducing apparatus which can reproduce the data in real time without being affected by dirt on or damage to the recording medium.

The foregoing object is accomplished by providing a dot-code recording method comprising: the step of arranging a plurality of dots to produce a dot pattern for one block and thereafter arranging a plurality of such one-block dot patterns; and the step of distributing individual arranged blocks according to specific rules and arranging them in non-time sequence.

Furthermore, a dot-code recording apparatus of the present invention comprises: block forming means for arranging a plurality of dots and generating a dot pattern for one block; block distributing means for preparing a plurality of one-block dot patterns generated by the block forming means and distributing individual blocks according to specific rules and arranging them in non-time sequence; and recording means for recording the individual blocks distributed by the block distributing means on a recording medium.

Additionally, a dot-code reproducing apparatus of the present invention comprises: reading means for reading a dot code from a recording medium, said dot code comprising plurality of one-block dot patterns each having a plurality of dots, said plurality of one-block dot patterns being distributed according to specific rules in a specific range to thereby be arranged in non-time sequence; block rearranging means for rearranging the one-block dot patterns read by the reading means in units of the specific range; and output means for outputting the rearranged one-block dot patterns.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

Figure 1:
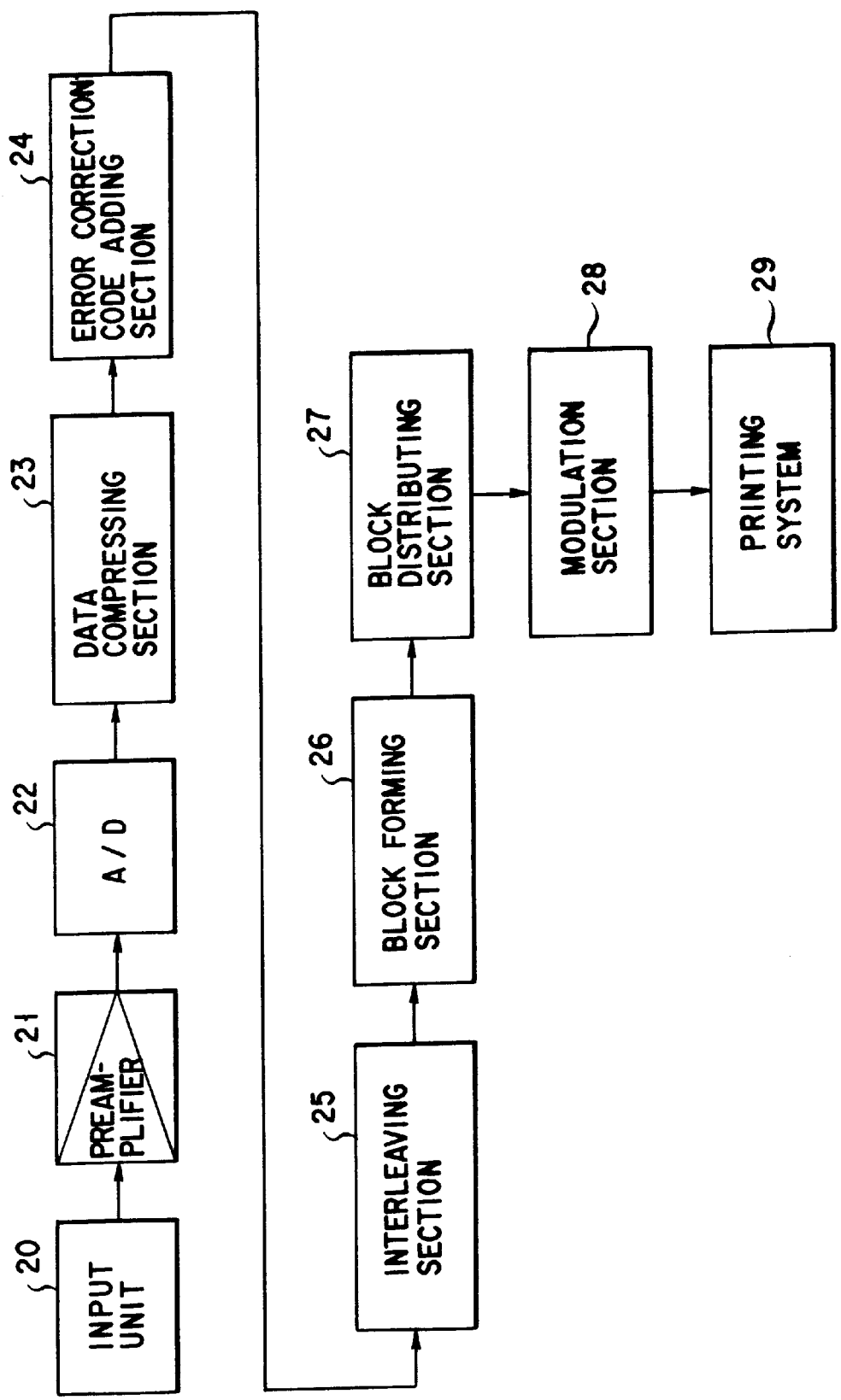
FIG. 1 is a block diagram of a dot-code recording apparatus according to an embodiment of the present invention.

Hereinafter, referring to the accompanying drawings, an embodiment of the present invention will be explained in detail. FIG. 1 shows the structure of a dot-code recording apparatus to which the present invention is applied. In the figure, after the input signal from a given type of input unit 20 is amplified by a preamplifier 21, it is A/D converted into a digital signal at an A/D converter (A/D) 22. The digital signal undergoes data compression at a data compressing section 23, and an error correction code is added by an error correction code adding section 24. Then, the data is subjected to an interleaving process by an interleaving section 25, and formed into blocks by a block forming section 26. A block address and a CRC code is then added for each block according to a specific recording format.

Thereafter, in a block distributing section 27, the individual blocks are distributed in a specific range of blocks and rearranged in non-time sequence. These rearranged blocks undergo a modulating process for recording by a modulation section 28. Then, the modulated blocks are subjected to a specific process for printing on paper by a printing system 29.

A dot-code recording method according to the present invention will be described with reference to FIGS. 3 and 4. The present invention (as shown in FIG. 4) is characterized in that in a dot code comprising a plurality of blocks, the individual blocks are arranged in such manner that they are distributed in a specific range of blocks, not in time sequence. For example, the blocks may be distributed in the same column or in the same row, or they may be distributed in a direction perpendicular to the direction in which the dot code is read, thereby arranging them in non-time sequence.

Figure 3:
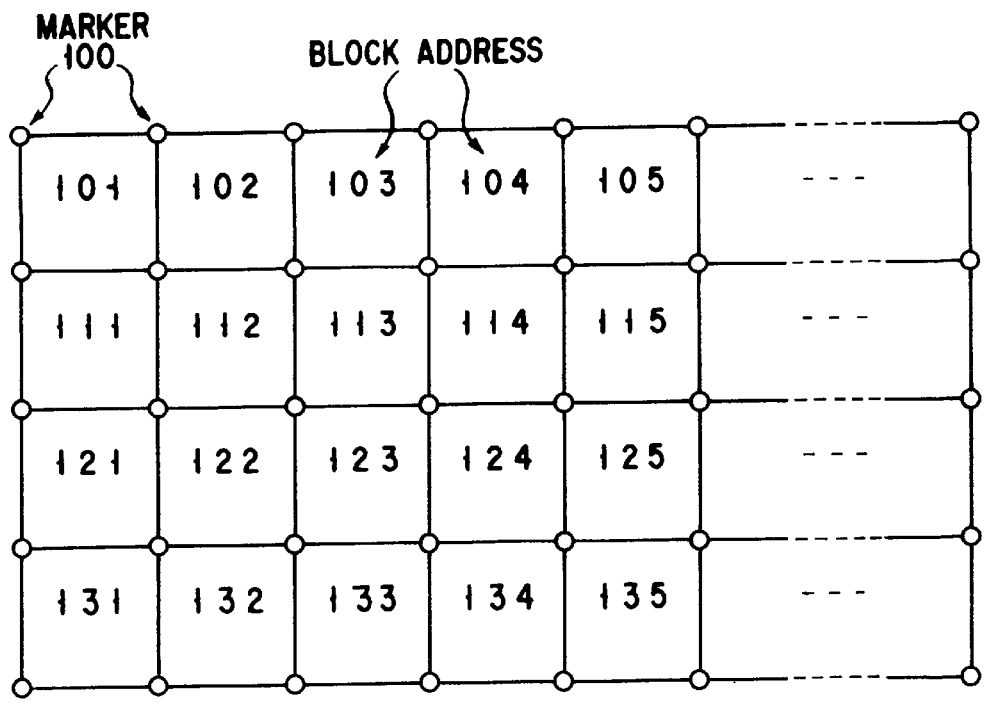
FIG. 3 is a drawing to help explain a conventional dot-code recording method.
Figure 4:
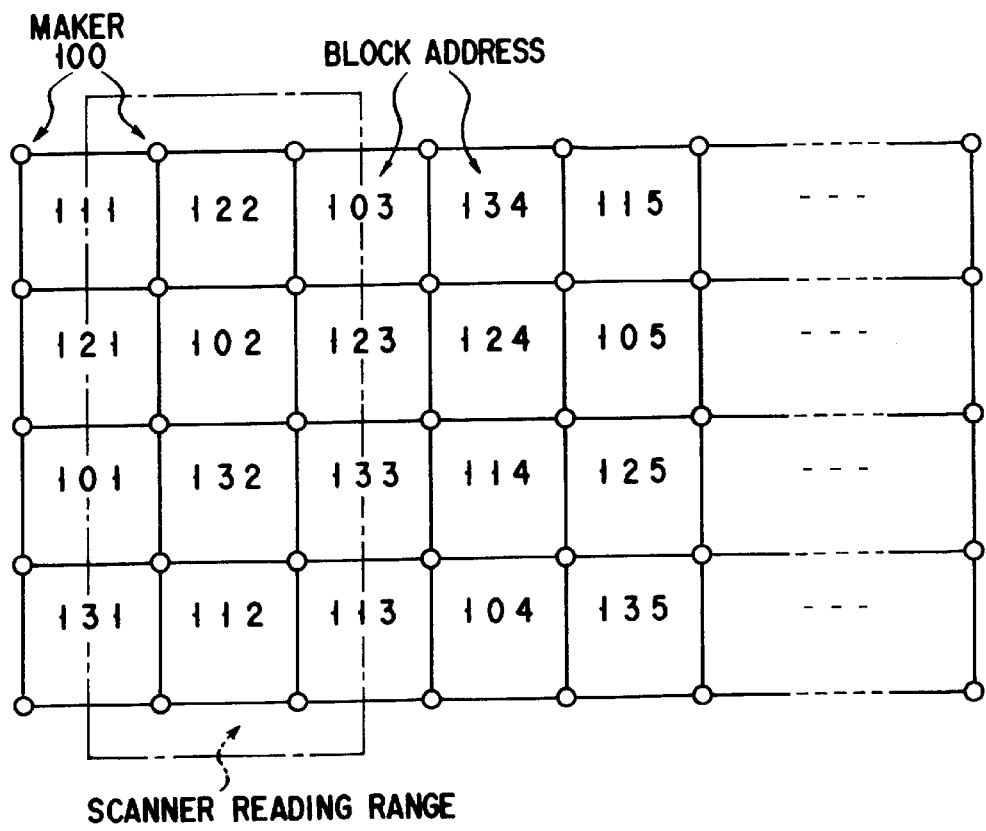
FIG. 4 is a drawing to help explain a dot-code recording method according to the embodiment.

FIG. 3 a dot code recorded by a conventional dot-code recording method. As shown in the figure, block addresses are added sequentially and the individual blocks are arranged in time sequence. Here, numeral 100 indicates a marker (for details with respect to the marker, refer to PCT publication No. WO94/08314). When the data is arranged in time sequence, a lack of data or data errors due to dirt on or damage to the recording medium are not distributed, so that errors have been distributed in an interleaving process are restored to the original data during decoding in a de-interleaving process. With this method, however, when the diffusion is enhanced to reduce the effects of dirt on or damage to the recording medium as described above, the data cannot be reproduced in real time. To overcome this problem, according to the present invention, as shown in FIG. 4, the individual blocks are distributed in a specific range of blocks (in the figure, in the same column) according to a specific rule, and are thus arranged in non-time sequence. Before performing the distributed arrangement among the blocks, the dots in the individual blocks may be distributed according to the contents thereof, and may then be subjected to the interleaving process for non-time sequence arrangement.

Figure 2:
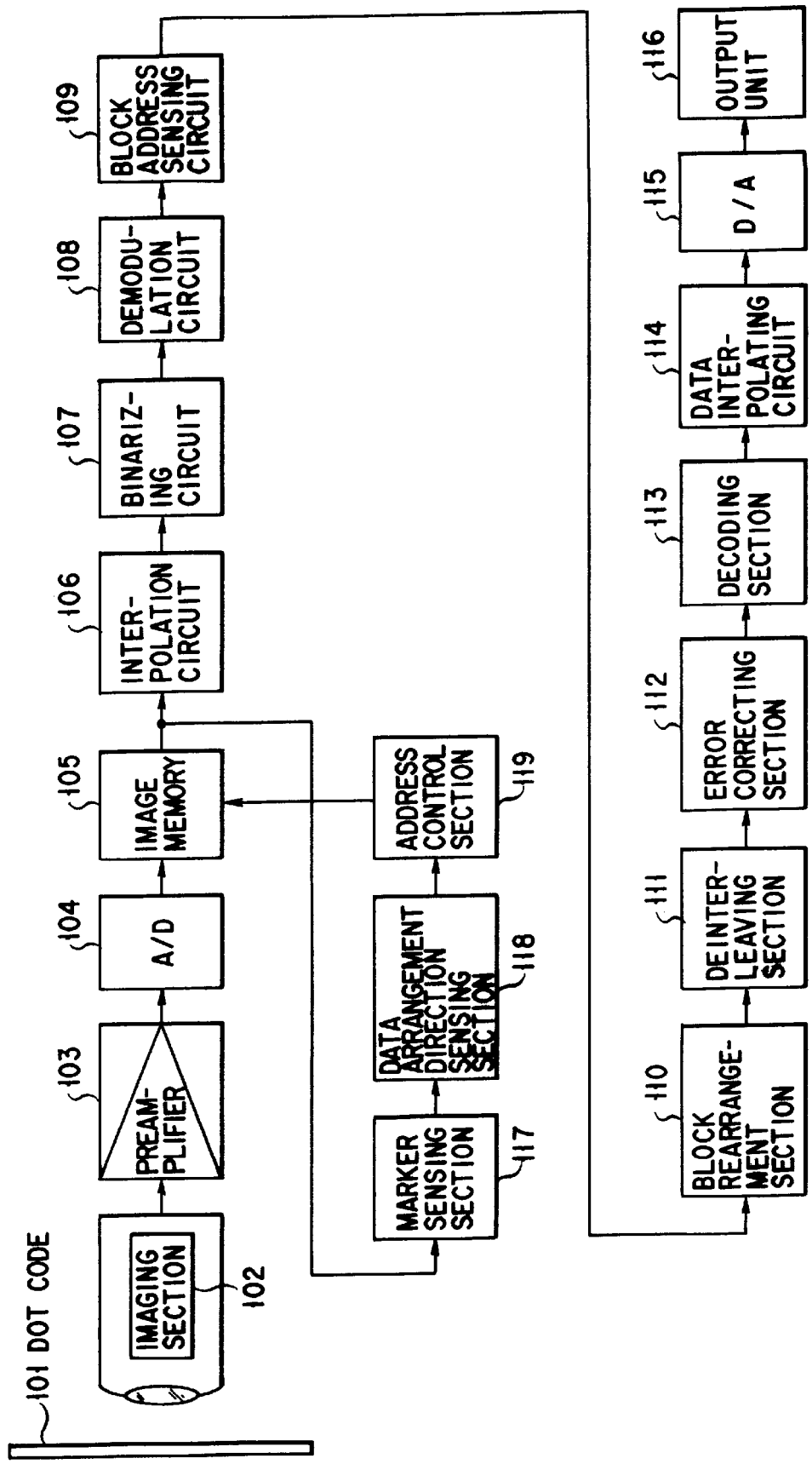
FIG. 2 is a block diagram of a dot-code reproducing apparatus according to an embodiment of the present invention.

Hereinafter, a technique for reproducing the dot codes recorded according to the recording method of the present embodiment will be explained. FIG. 2 shows the structure of a dot-code reproducing apparatus. In the figure, the dot codes 101 recorded on a recording medium such as paper are read by an imaging section 102 and amplified by a preamplifier 103. Thereafter, the amplified signal is converted by an A/D converter (A/D) 104 into digital data. The digital data is once stored in an image memory 105. Under the control of an address control section 119, the digital data is read from the memory as required. A marker sensing section 117 senses a marker 100 from the read-out data and a data arrangement direction sensing section-118 senses the arrangement direction of dot code data.

After the dot code read from the image memory 105 undergoes an interpolating process at an interpolation circuit 106, it is binarized at a binarizing circuit 107, demodulated at a demodulation circuit 108, and is supplied to a block address sensing circuit 109. The block address sensing circuit 109 senses an address for each block. With the embodiment, each block has a block address (X address and Y address), to that even if the order of block arrangement is not known, the data can be decoded easily without a special process, on the basis of the block address of each block.

Then, the dot codes are supplied to a block rearrangement section 110. The block rearrangement section 110 rearranges the blocks which have been distributed in non-time sequence by the block distributing section 27. After the rearranging of blocks has been completed, a de-interleaving section 111 performs a deinterleaving process and an error correcting section 112 performs an error correcting process. Thereafter, a decoding section 113 effects decoding and a data interpolating circuit 114 performs an interpolating process. Then, a D/A converter (D/A) 115 converts the interpolated signal into an analog signal, which is supplied to an output unit 116, which then outputs video, audio, or character information.

As described above, according to the present invention, the individual blocks are distributed two-dimensionally in a specific range in non-time sequence according to a specific rule, allowing lack of data or data errors due to dirt on or damage to the recording medium (e.g., paper) to diffuse and be inconspicuous. When the individual blocks are distributed and arranged in a specific range of blocks, in non-time sequence, an increase in the memory for storing data and a real-time loss in data reproduction can be avoided, as compared with the case where the individual blocks are distributed and arranged only two-dimensionally in time sequence. The reasons for this are that when the individual blocks are distributed and arranged only two-dimensionally, in time sequence memory is needed to store the data corresponding to the read-in blocks until all of the information necessary for data reproduction has been prepared, and that because data reproduction cannot be effected until all of the necessary data has been prepared, operation cannot be performed in real time. When the blocks are distributed and arranged in a specific range of blocks (e.g., in the same column) in non-time sequence, however, only a minimum number of blocks in a specific direction have to be stored in the memory and data reproduction can be effected at the time when all of the blocks in the specific direction have been prepared. For the same reason, it is desirable that the conventional interleaving process should be carried out over the blocks arranged in a specific direction.

The present invention achieves the following advantageous effects:

(1) At the stage where the data dot patterns are grouped into blocks, they are distributed according to specific rules two-dimensionally, not in time sequence, so that errors due to dirt on or damage to the recording medium can be distributed. Therefore, the effect of dirt on or damage to the recording medium can be minimized and the dot codes can be reproduced in real time.

(2) Use of the interleaving process enhances the error distribution and improves the real-time performance in reproduction.

(3) The error distribution can be expanded in the same time equal to the processing time of only the interleaving process.

(4) The individual blocks are distributed in a specific range of blocks, resulting in neither the degradation of the real-time performance nor an increase in the memory.

(5) Errors can be distributed, maintaining the real-time performance, with a decreased memory capacity.

(6) Even if the order of block arrangement is unknown, the dot codes can be restored easily from the address data on each block.

(7) At the stage where the dot patterns are grouped into blocks, they are distributed according to specific rules two-dimensionally, not in time sequence, so that errors due to dirt on or damage to the recording medium can be distributed.

(8) The dot codes can be reproduced without being affected by dirt on or damage to the recording medium.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A dot-code recording method comprising the steps of:
generating a plurality of one-block dot patterns, each said one-block dot pattern comprising a plurality of dots;
arranging the plurality of one-block dot patterns to represent multimedia information;
distributing a specific range of the plurality of one-block dot patterns according to specific rules to thereby arrange the one-block dot patterns within the specific range in non-time sequence; and
recording the non-time sequence distributed one-block dot patterns on a recording medium,
wherein, when distributing the one-block dot patterns to arrange the one-block dot patterns within the specific range in non-time sequence, the one-block dot patterns are distributed among a predetermined number of blocks which are only a part of a plurality of blocks composing a dot code to be arranged in non-time sequence.

2. A dot-code recording method according to claim 1, further comprising the step of distributing the dots in each of the one-block dot patterns to thereby arrange the dots in each of the one-block dot patterns in non-time sequence.

3. A dot-code recording method according to claim 2, wherein the step of distributing the plurality of one-block dot patterns among the predetermined number of blocks which are a part of the plurality of blocks composing the dot code is carried out after the step of distributing the dots in each of the one-block dot patterns.

4. A dot-code recording method according to claim 1, wherein the specific range comprises one of: (i) a same column of the one-block dot patterns, (ii) a same row of the one-block dot patterns, and (iii) a range of the one-block dot patterns in a direction perpendicular to a reading direction.

5. A dot-code recording method according to claim 1, wherein each of the one-block dot patterns is provided with specific address data.

6. A dot-code recording apparatus comprising:

block generating means for generating a plurality of one-block dot patterns, each said one-block dot pattern comprising a plurality of dots;

block arranging means for arranging the plurality of one-block dot patterns to represent multimedia information;

block distributing means for distributing a specific range of the plurality of one-block dot patterns according to specific rules to thereby arrange the one-block dot patterns within the specific range in non-time sequence; and recording means for recording the non-time sequence distributed one-block dot patterns on a recording medium, wherein, when said block distributing means distributes the one-block dot patterns to arrange the one-block dot patterns within the specific range in non-time sequence, said block distributing means distributes the one-block dot patterns among a predetermined number of blocks which are only a part of a plurality of blocks composing a dot code.

7. A dot-code reproducing apparatus comprising:

reading means for optically reading a dot code recorded on a recording medium, said dot code comprising a plurality of one-block dot patterns, each said one-block dot patterns comprising a plurality of dots, and said one-block dot patterns being distributed according to specific rules in a specific range to thereby be arranged in non-time sequence;

block rearranging means for rearranging the one-block dot patterns of the dot code read by the reading means in units of the specific range; and output means for outputting the rearranged one-block dot patterns, wherein, when the one-block dot patterns within the specific range of said dot code are arranged in non-time sequence, the one-block dot patterns are distributed among a predetermined number of blocks composing the dot code, and wherein the block rearranging means rearranges the one-block dot patterns among the predetermined number of blocks which are only a part of the plurality of blocks composing the dot code.

* * * * *